United States Patent [19]

Blake et al.

[11] Patent Number: 5,148,236
[45] Date of Patent: Sep. 15, 1992

[54] DEMODULATION REFERENCE SIGNAL SOURCE

[75] Inventors: James Blake; Preston Dane; Rudolf Dankwort, all of Phoenix, Ariz.

[73] Assignee: Honeywell Inc., Minneapolis, Minn.

[21] Appl. No.: 539,634

[22] Filed: Jun. 18, 1990

[51] Int. Cl.⁵ .......................................... G01C 19/72
[52] U.S. Cl. .................................................. 356/350
[58] Field of Search ......................................... 356/350

[56] References Cited

U.S. PATENT DOCUMENTS

| | | | |
|---|---|---|---|
| 4,728,192 | 3/1988 | Shaw et al. | 356/350 |
| 4,883,358 | 11/1989 | Okada | 356/350 |
| 5,018,859 | 5/1991 | Chang et al. | 356/350 |

Primary Examiner—Samuel A. Turner
Assistant Examiner—La Charles Keesee
Attorney, Agent, or Firm—Theodore F. Neils

[57] ABSTRACT

An information retrieval system for extracting information from a pair of substantially coherent electromagnetic waves represented by phase differences therebetween each of which is incident on a photodetector, and having a demodulator which receives the photodetector output signal and which also receives a reference signal. The reference signal is obtained through use of a phase shift detector which receives the photodetector signal to determine certain phase shifts occurring therein and provides this information to a reference signal supply to adjust the phase of its output signal which then serves as the reference signal for the demodulator.

32 Claims, 4 Drawing Sheets

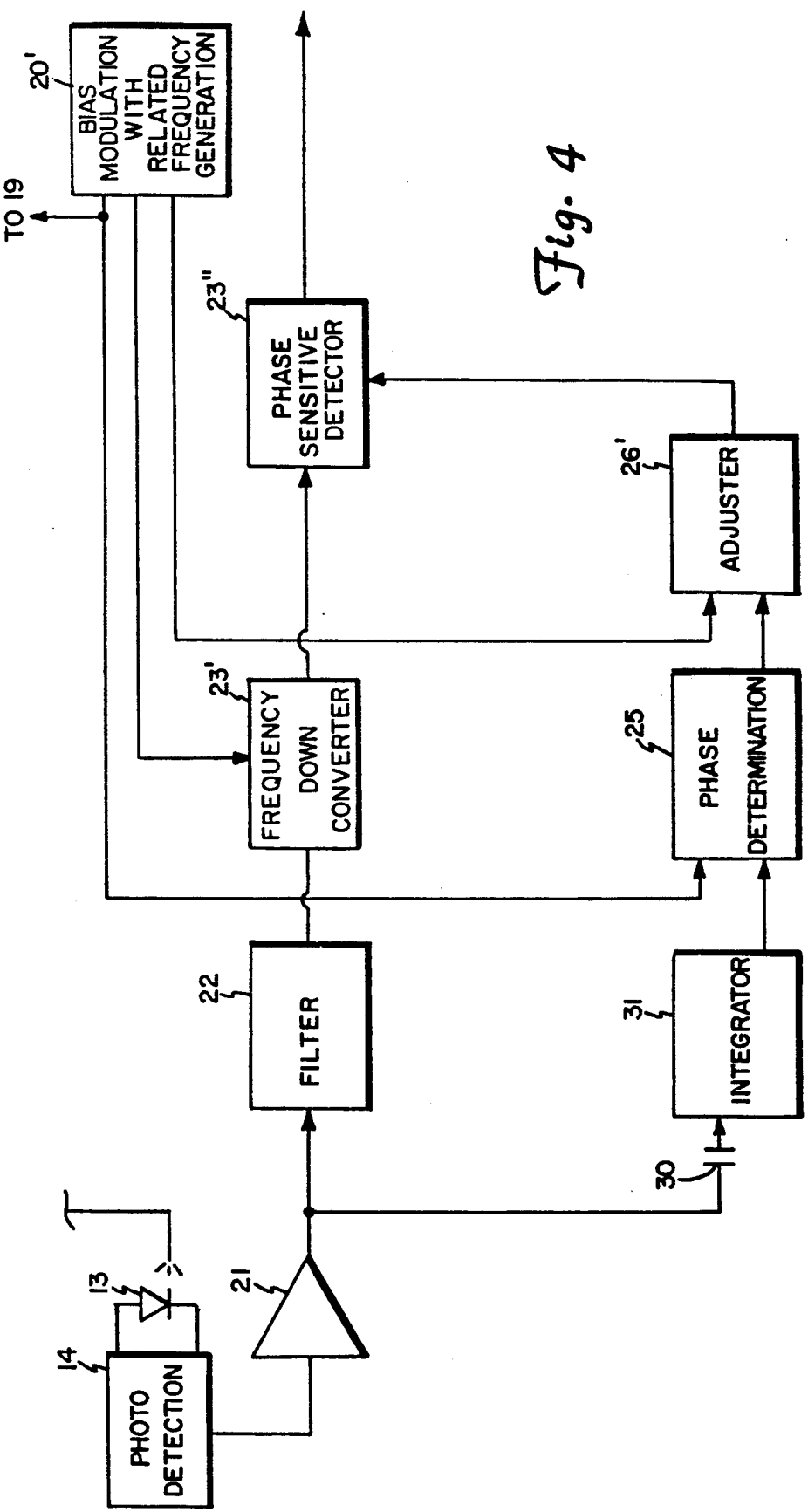

DEMODULATION REFERENCE SIGNAL SOURCE

BACKGROUND OF THE INVENTION

The present invention concerns demodulators for phase modulated signals and, more particularly, demodulators for phase modulated signals obtained from electromagnetic waves subjected to phase modulation.

Fiber optic gyroscopes are an attractive means with which to sense rotation of an object supporting such a gyroscope. Such gyroscopes can be made quite small and can still be constructed to withstand considerable mechanical shock, temperature change, and other environmental extremes. In the absence of moving parts, they can be nearly maintenance free, and they have the potential of becoming economical in cost. They can also be sensitive to low rotation rates that can be a problem in other kinds of optical gyroscopes.

Such fiber optic gyroscopes have a coil of optical fiber wound on a core and about the axis thereof around which rotation is to be sensed. The optical fiber is typically of a length of 100 to 2,000 meters, or so, and is part of a closed optical path in which an electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e. the well known Sagnac effect. The use of a coiled optical fiber is desirable because the amount of phase difference shift due to rotation, and so the output signal, depends on the length of the entire optical path through the coil traversed by the two opposing direction electromagnetic waves, and so a large phase difference shift can be obtained in the long optical fiber but in a relatively small volume taken by it through being coiled.

The output current from the photodetector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator on one side of the coiled optical fiber. As a result, one of the opposite direction propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the optical phase modulator and the phase-sensitive detector can be operated by a sinusoidal signal generator at the so-called "proper" frequency to reduce or eliminate modulator induced amplitude modulation, but other waveform types of the same fundamental frequency can be used. Other frequencies can also be used, and often are to reduce the frequency level to a more manageable value.

The resulting signal output of the phase-sensitive detector follows a sine function, i.e. the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of at zero phase shift, and so changes algebraic sign on either side of zero phase shift. Hence, the phase-sensitive detector signal can provide an indication of which direction a rotation is occurring about the axis of the coil, and can provide the maximum rate of change of signal value as a function of rotation rate near a zero rotation rate, i.e. the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector.

An example of such a system from the prior art is shown in FIG. 1. The optical portion of the system contains several features along the optical paths to assure that this system is reciprocal, i.e. that substantially identical optical path occur for each of the opposite direction propagating electromagnetic waves except for the specific introductions of non-reciprocal phase difference shifts, as will be described below. The coiled optical fiber forms a coil, 10, about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity as well as the introduction of non-reciprocal phase shifts as is indicated to be done below.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e. the slower propagation axis, or the low index axis is chosen for propagating the electromagnetic waves depending on the other optical components in the system. In the present system, the slow axis has been chosen in view of the optical components used therein.

The electromagnetic waves which propagate in opposite directions through coil 10 are provided from an electromagnetic wave source, or light source, 11, in FIG. 1. This source is typically a laser diode which provides electromagnetic waves, typically in the nearinfrared part of the spectrum, with a typical wavelength of 830 nm. Source 11 must have a short coherence length for emitted light to reduce the phase shift difference errors between these waves due to Rayleigh and Fresnel scattering at scattering sites in coil 10. Because of the nonlinear Kerr effect in coil 10, different intensities in the two counter propagating waves can lead to different phase shifts therebetween. This situation can be overcome also by use of a short coherence length source for source 11 which leads to modal phase shift canceling.

Between laser diode II and fiber optic coil 10 there is shown an optical path arrangement in FIG. 1 formed by the extension of the ends of the optical fiber forming coil 1? to some optical coupling components which separate the overall optical path into several optical path portions. A portion of the same kind of polarization-maintaining optical fiber as in coil 10 is positioned against laser diode 11 at a point of optimum light emission therefrom, a point from which it extends to a first optical directional coupler, 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode, 13, which is electrically connected to a photodetection system, 14.

Photodiode 13 detects electromagnetic waves, or light waves, impinging thereon from the portion of the optical fiber positioned thereagainst and provides a photo current in response. This photocurrent, as indicated above, in the case of two nearly coherent light waves impinging thereon, follows a cosine function in providing a photocurrent output which depends on the cosine of the phase difference between such a pair of substantially coherent light waves. This photovoltaic device will operate into a very low impedance to provide the photo current which is a linear function of the impinging radiation, and may typically be a p-i-n photodiode.

Optical directional coupler 12 has another optical fiber against a port at the other end thereof which extends to a polarizer, !5. At the other port on that same side of coupler 12 there is a non-reflective termination arrangement, !6, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no light is transmitted to the port which is on the same end of coupler 12 as is the incoming light port.

Polarizer 15 is used because, even in a single spatial mode fiber, two polarization modes are possible in light passing through the fiber. Thus, polarizer 15 is provided for the purpose of passing one of these polarization modes through the optical fiber, along the slow axis thereof as indicated above, while blocking the other. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the light transmission medium contained therein positioned therebetween. Positioned against the port on the end thereof opposite that connected to optical directional coupler 12 is another optical fiber portion which extends to a further optical bidirectional coupler, 17, which has the same light transmission properties as does coupler 12.

The port on the same end of coupler 17 from which a port is coupled to polarizer 15 again is connected to a non-reflective termination arrangement, 18, using a further optical fiber portion. Considering the ports on the other end of coupler 17, one is connected to further optical components in the optical path portions extending thereto from one end of the optical fiber in coil 10. The other port in coupler !7 is directly coupled to the remaining end of optical fiber 10. Between coil 10 and coupler 17, on the side of coil 10 opposite the directly connected side thereof, is provided an optical phase modulator, 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in light transmitted therethrough by changing the index of refraction of the transmission medium, or transmission media, therein to thereby change the optical path length. Such electrical signals are supplied to modulator 19 by a bias modulation signal generator, 20, providing a sinusoidal voltage output signal at a modulation frequency $f_g$ that is equal to $C_1 \sin(\omega_g t)$ where $\omega_g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of that light entering coupler 12 from source 11 is lost in non-reflecting terminating arrangement 16 coupled to a port on the opposite end thereof, but the rest of that light is transmitted through polarizer 15 to optical directional coupler 17.

Coupler 17 serves as a beam-splitting apparatus in which the light entering the port thereof, received from polarizer 15, splits approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning light is lost in non-reflective arrangement 18 connected to the other port on the polarizer 15 connection end of coupler 17, but the rest of that light passes through the other port of coupler 17 to polarizer 15 and to coupler 12 where a portion of it is transmitted to photodiode 13. The other part of the light passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13 provides an As indicated above, photodiode 13 provides an output photocurrent, $I_{PD13}$, proportional to the intensity of the two electromagnetic or light waves impinging thereon, and is therefore expected to follow the cosine of the phase difference between these two waves impinging on that diode as given by the following equation:

$$I_{PD13} = \frac{I_o}{2} [1 + \cos(\phi_R + \phi_m \cos\omega_g t)]$$

This is because the current depends on the resulting optical intensity of the two substantially coherent waves incident on photodiode 13, an intensity which will vary from a peak value of $I_o$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with a maximum value of $\phi_m$ and which varies as $\cos(\omega_g t)$.

Optical phase modulator 19 is of the kind described above and is used in conjunction with a phase-sensitive detector as part of a demodulation system for converting the output signal of photodetection system 14, following a cosine function as indicated above, to a signal following a sine function. Following such a sine function provides in that output signal, as indicated above, information both as to the rate of rotation and the direction of that rotation about the axis of coil 10.

Thus, the output signal from photodetection system 14, including photodiode 13, is provided through an amplifier, 21, where it is amplified and passed through a filter, 22, to such a phase sensitive detector means, 23. Phase-sensitive detector 23, serving as part of a phase demodulation system, is a well known device. Such a phase-sensitive detector senses a change in the first harmonic, or fundamental frequency, of modulation signal generator 20 to provide an indication of the relative phase of the electromagnetic waves impinging on photodiode 13. This information is provided by phase-sensitive detector 23 in output signal following a sine function, that is, this output signal follows the sine of the phase difference between the two electromagnetic waves impinging on photodiode 13.

Bias modulator signal generator 20, in modulating the light in the optical path at the frequency $f_g$ described above, also generates harmonic components in photodetection system 14. Filter 22 is a bandpass filter which is to pass the modulation frequency component of the output signal of photodetector 14, i.e. the first harmonic, after its amplification by amplifier 21.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude scaling factor of the modulation frequency component of the output signal of photodetection system 14, appearing at the output of filter 22, is expected to be set by the sine of this phase difference modified further only by the factors of a) the amplitude value of the maximum phase modulation waves due to modulator 19 and generator 20, and b) a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof applied to the sine of the phase difference.

However, these desired results may not be achieved in the system of FIG. 1. The output of amplifier 21 will provide a voltage output signal based not only on the in-phase photocurrent generated in photodiode 13 in photodetector system 14, as indicated by the first equation above, but also on a quadrature component of that photocurrent not given by that equation. Such a quadrature component usually arises in the optical system portion of FIG. 1, typically due to intensity modulation induced by phase modulator 19. There can be other sources for such a quadrature component such as due to "pick-up" from other signals present in the system.

Furthermore, there will be added phase delay beyond that which is shown in the first equation above. Some of this phase shift will be introduced in photodetection system 14, and that phase shift will be both temperature dependent and component aging dependent so that its value at any time during operation will typically not be known, and will vary in subsequent operation. There are other sources of such phase shift also, including the phase shift across modulator 19 between the phase of the signal supplied by generator 20 and the response of modulator 19 in having the index of refraction of the media therein, or its length, correspondingly change. Thus, the output signal of amplifier 21 will have a phase delay therein with respect to the phase of the signal provided by generator 20. This additional phase, $\theta$, is equivalent to a time delay of duration $T_d$ where $\omega T_D = \theta$ if the phase shift is linear with frequency or a reasonable approximation can be made that is linear.

Thus, the voltage at the output of amplifier 21 will typically appear as:

$$V_{21-out} = \epsilon(1 + \cos[\phi_R + \phi_m \cos(\omega_g t + \phi)]) + \epsilon \sin(\omega_g t + \phi)$$

with the left-hand term on the right side of the equal sign being based on the in-phase component of the output current and the right-hand sine term being based on the quadrature component of that voltage at the modulation frequency. The constants k and $\epsilon$ represent the gains through the system to the output of amplifier 21. The other symbols used in the preceding equation have the same meaning they did in the first equation above. The foregoing equation can be expanded in a Bessel series expansion to give the following:

$$V_{21-out} = \epsilon\sin(\omega_g t + \theta) + k[1 + J_0(\phi_m)\cos\phi_R] -$$
$$2kJ_1(\phi_m)\sin\phi_R\cos(\omega_g t + \theta) - 2kJ_2(\phi_m)\cos\phi_R\cos2(\omega_g t + \theta) +$$
$$2kJ_3(\phi_m)\sin\phi_R\cos3(\omega_g t + \theta) +$$

-continued $$\sum_{n=2}^{\infty} [(-1)^n 2kJ_{2n}(\phi_m)\cos\phi_R\cos 2n(\omega t + \theta) +$$

$$(-1)^n 2kJ_{2n+1}(\phi_m)\sin\phi_R\cos(2n + 1)(\omega_g t + \theta)]$$

This signal at the output of amplifier 21 is applied to the input of filter 22.

Filter 22, as indicated above, passes primarily the first harmonic from the last equation, i.e. the modulation frequency component. As a result, the output signal of filter 22 can be written as follows:

$$V_{22\text{-}out} = -2kJ_1(\phi_m)\sin\phi_R\cos(\omega_g t + \phi + \psi_1) + \epsilon\sin(\omega_g t + \phi + \psi_1)$$

The further phase delay term appearing, $\psi_1$, is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulation generator 20, the latter again being equal to $C_1\sin(\omega_g t)$ where $\omega_g$ is the radian frequency equivalent of the modulation frequency $f_g$. Since the value of the added phase shift $\psi_1$ in filter 22 is known, a phase shift equal to that can be added by phase-sensitive detector 23 before using that signal. However, the phase shift $\theta$ is unknown, and so cannot be added by phase-sensitive detector 23. The output of phase-sensitive detector 23, based on the known behavior of such devices, will then be the following:

$$V_{23-out} = k'J_1(\phi_m)\cos\theta\sin\phi_R + k'\frac{\epsilon}{k}\sin\theta$$

The constant $k'$ accounts for the gain through phase-sensitive detector 23. As can be seen, a cosine factor depending on $\theta$ appears in the in-phase component based portion of the output signal of phase-sensitive detector 23. The added phase shift $\theta$ will affect the accuracy of the portion of the output of phase-sensitive detector 23 represented by the term in which $\cos\theta$ appears. In addition, a significant quadrature component based portion of this output signal having a sine factor depending on $\theta$ will also be present at the output signal of phase-sensitive detector 23, and will often constitute a significant error in being much larger than the in-phase component based portion which can be relatively small at low rotation rates. Thus, there is desired a demodulation arrangement which will avoid the presence of this quadrature related term in the output signal of the phase-sensitive detector.

SUMMARY OF THE INVENTION

The present invention provides an information retrieval system for extracting information from a pair of substantially coherent electromagnetic waves from a source, with such information being represented by phase differences therebetween, each of which waves is incident on a photodetector. These waves have further phase differences therebetween varying at a modulation frequency due to being phase modulated with the photodetector being capable of providing an output signal representing the waves as incident thereon but also representing any further processing phase shifts arising because of the generation of the waves or due to the photodetector. The information retrieval system comprises a demodulator which receives the photodetector output signal and also receives a reference signal. The reference signal is obtained through use of a phase shift detector which receives the photodetector output signal, and which determines at least the processing phase shift occurring therein, providing this information to a reference signal supply to adjust the phase of its output signal, along with predetermined phase shift information previously provided thereto, which is supplied as a reference signal to the demodulator. The foregoing electromagnetic waves are developed in the source thereof as opposite direction traveling waves through a fiber optic coil and modulated by an optical modulator in the optical path of these waves. The first harmonic of the photodetector signal is primarily supplied to the demodulator, with the phase shift detector receiving a selected one of (a) the time integral of the photodetector signal, (b) the time derivative of the photodetector signal, and (c) the second harmonic component of the photodetector signal.

BRIEF DESCRIPTION OF THE DRAWINGS

FIG. 4 shows a mixed block and circuit schematic diagram embodying the present invention which can be substituted for a portion of the diagram of FIG. 1.

DETAILED DESCRIPTION OF THE PREFERRED EMBODIMENTS

Figure 1:
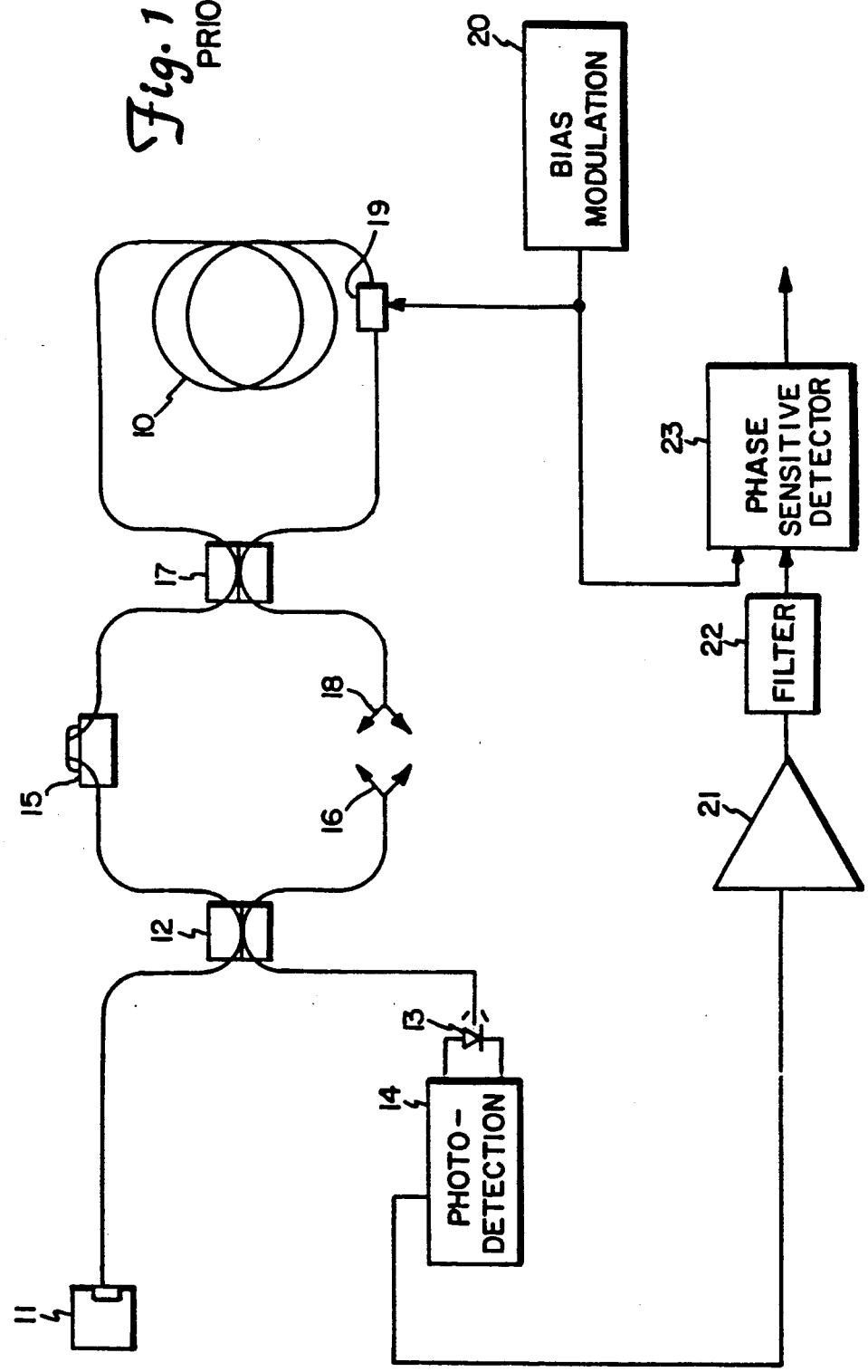
FIG. 1 shows a mixed block and circuit schematic diagram of a system known in the prior art.

Because the added processing phase shift δ generated in the optical portion of FIG. 1, and in photodetection circuit 14 thereof, varies with temperature and time, there is no satisfactory way of predicting its value. Yet, elimination of a quadrature term in the output of phase-sensitive detector 23 can be accomplished only through demodulating the rotation rate data signal supplied thereto from filter 22 by use of a reference signal which is synchronized and phase matched (in-phase) with this rotation rate data signal. Since this cannot be the situation for the reference signal supplied by bias modulation generator 20, as that signal is not subject to the sources of phase shift affecting the output signal of filter 22, the output signal of that generator cannot be the direct source of the reference signal used in phase-sensitive detector 23 as shown in FIG. 1. Rather, the reference signal for phase-sensitive detector 23 must be obtained from the rotation rate data signal since that is the only signal which has in it the information as to the value of the added processing phase shift $\theta$ due to the optical system and photodetection system 14.

Figure 2:
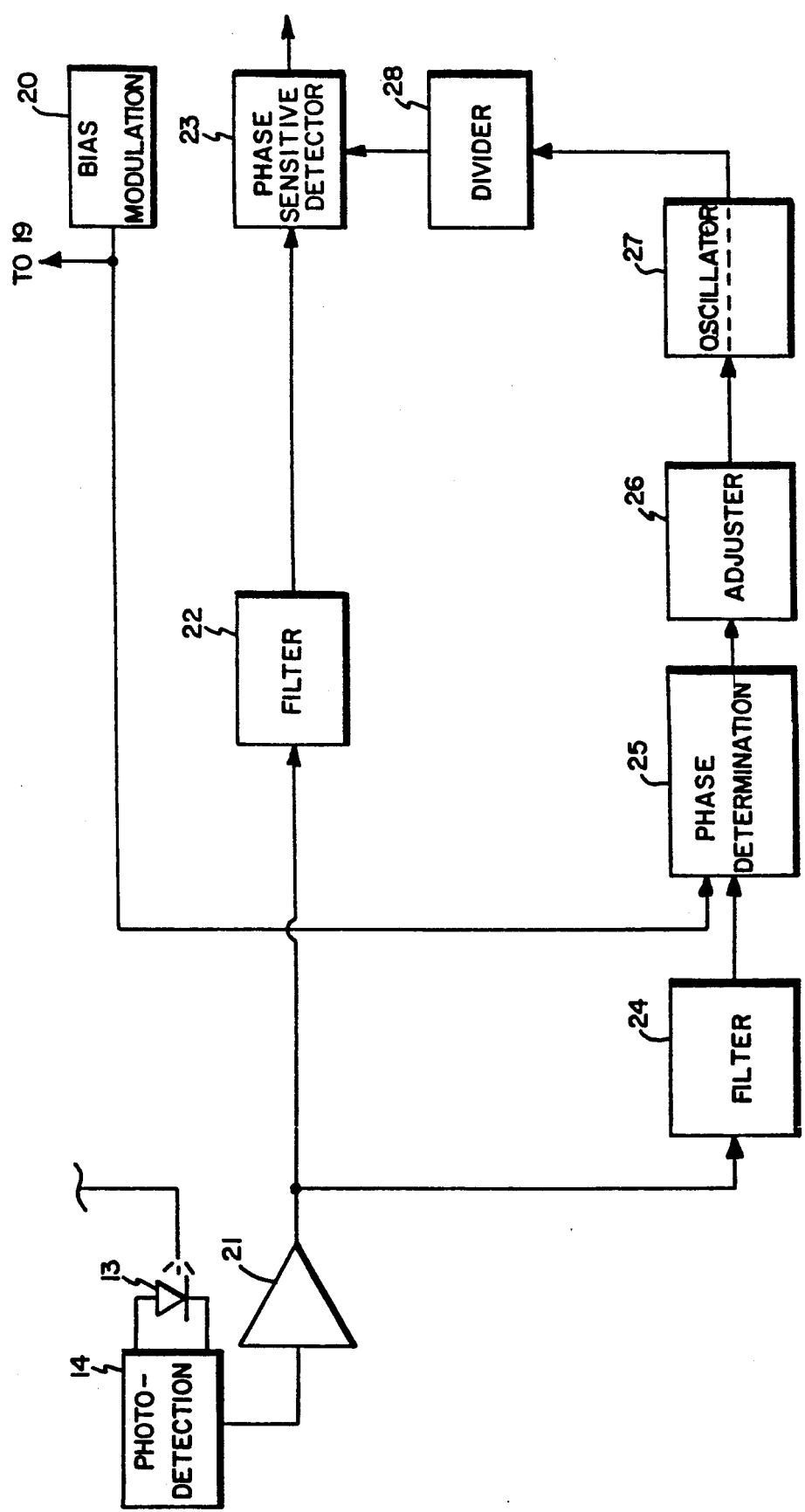
FIG. 2 shows a mixed block and circuit schematic diagram embodying the present invention which can be substituted for a portion of the diagram of FIG. 1.

Hence, the lower portion of FIG. 1, after amplifier 21 and before phase-sensitive detector 23, must be modified to permit extracting a suitable reference signal from the rotation rate data signal supplied at the output of filter 22. One manner of accomplishing this is shown in the system of FIG. 2 which can be substituted for the portions of the system of FIG. 1 not directly involved in the optical portion of that system. The system and circuit components of FIG. 2 which are the same as those shown in FIG. 1 carry the same numerical designations in each figure.

As indicated above, the output of amplifier 21 is a signal voltage that is based on the photocurrent developed through photodiode 13 because of the impingement of the two electromagnetic waves thereon from the optical system portion shown in FIG. 1. This output voltage, $v_{21\text{-}out}$, comprises a portion based on the quadrature component of the photodiode current, and a portion based on the harmonic components plus a constant polarity term forming the in-phase component of the photodiode current as shown in the equation above for the expanded version of this voltage. Again, filter 22 selects primarily the harmonic component of the in-phase portion of $v_{21\text{-}out}$ at the modulation frequency $f_g$, i.e. the first harmonic thereof, and presents that as its output voltage, $v_{22\text{-}out}$, to the data input of phase-sensitive detector 23.

This voltage signal at the output of filter 22, as the equation therefor above shows, contains the added processing phase shift $\theta$ of unknown but changing value. This phase shift value must be added as an additional phase shift in the reference signal to be supplied at the reference signal input of phase-sensitive detector 23, as well as adding other known phase shifts thereto, if demodulation of a sufficient quality is to be provided to eliminate any quadrature component from the voltage signal developed at the output of phase-sensitive detector 23.

In FIG. 2, the source of that information as to the value of $\theta$ is obtained from the second harmonic of the in-phase component of the photodiode output current as represented in the voltage signal at the output of amplifier 21 in the manner indicated by the above equation for $V_{21\text{-}out}$ (although a higher order even harmonic could have been chosen). This is accomplished through a further bandpass filter, 24, having its input connected to the output of amplifier 21. The pass band of filter 24 is centered about the frequency of the component of the output voltage of amplifier 21 representing the second harmonic of the output current of photodiode 13, and so provides the following voltage signal at the output of filter 24:

$$V_{24\text{-}out} = -2kJ_2(\phi_m)\cos\phi_R\cos[2(\omega_g t + \theta) + \psi_2]$$

The added phase shift $\psi_2$ in filter 24 beyond that at the output of amplifier 21 is the phase shift contributed by filter 24.

Output voltage $V_{24\text{-}out}$ of filter 24 is provided to a phase determination means, 25. Phase determination means 25 is typically a zero-crossing detector to detect the zero-crossings of output voltage $V_{24\text{-}out}$ that occur closest to the zero-crossings of the output voltage of bias modulation generator 20. Since the processing phase shift $\theta$ added by the optical system of FIG. 1 and photodetection system 14 thereof is expected to be relatively small, the zero-crossings of second harmonic filter 24 output voltage $V_{24\text{-}out}$ that are of interest will be those relatively close to the zero-crossings of bias modulation generator 20. The zero-crossings of interest of the second harmonic component of the output of amplifier 21 provided by filter 24, that is, the output voltage $v_{24\text{-}out}$ of filter 24, can be seen to be from the foregoing equation to occur at $$t_n = \frac{1}{2\omega_g}(2n-1)\frac{\pi}{2} - \frac{\theta}{\omega_g} - \frac{\psi_2}{2\omega_g}$$

These follow from the cosine time dependence of output voltage $v_{24\text{-}out}$ and the argument thereof as shown in the equation preceding the last. These zero-crossing points serve as synchronizing time values in operating a subsequent oscillator.

These synchronizing values from phase determination means 25 are provided to a phase adjuster, 26. Phase adjuster 26 is provided to remove any differences in the phase delays introduced in filters 22 and 24, and can do so since such phase delays in each are stable and predictable. This difference is equal to $\psi_2/2\omega_g - \psi_1/\omega_g$.

Phase adjuster 26 adds this difference in time delay to the synchronizing values supplied thereto and then passes them on to an oscillator, 27. This oscillator generates a corresponding oscillatory output which can be a cosine wave or, often more conveniently, a square wave. The output of oscillator 27 at the second harmonic frequency $2f_g$ is supplied to a divider, 28, which divides the frequency by 2 to provide an oscillatory output wave having corresponding modulation frequency zero-crossings, or zero-crossings at $$t_n = \frac{1}{\omega_g}(2n-1)\frac{\pi}{2} - \frac{\theta}{\omega_g} - \frac{\psi_1}{\omega_g}$$

These are exactly in phase with voltage $v_{22\text{-}out}$ supplied at the output of filter 22, and thus an accurate demodulation is supplied of this latter voltage by phase-sensitive detector 23. As a result, the output of phase-sensitive detector 23 will be $$V_{23\text{-}out} = k'J_1(\phi_m)\sin\phi_R$$

where $k'$ again represents the accumulated gain constants in the system. If the amplitude of the phase modulation $\phi_m$ provided by bias modulation generator 20 and modulator 19 stays constant, then $V_{23\text{-}out}$ will depend only on the sine of the rotation induced phase difference $\phi_R$.

Alternatively, oscillator 27 could be eliminated if phase determination means 25 provides, as an output signal therefrom, an oscillatory signal with zero-crossings occurring exactly at the synchronizing values described above. Then, adjuster 26 would adjust the phase of this oscillatory wave from phase determination means 25, and the resulting oscillatory signal at the output of adjuster 26 would be divided by divider 28. As a result, oscillator 27 is shown with a dashed line therethrough to indicate the alternative of eliminating that component. In this latter approach, divider 28 and adjuster 26 could be interchanged in position with oscillator 27 eliminated.

Figure 3:
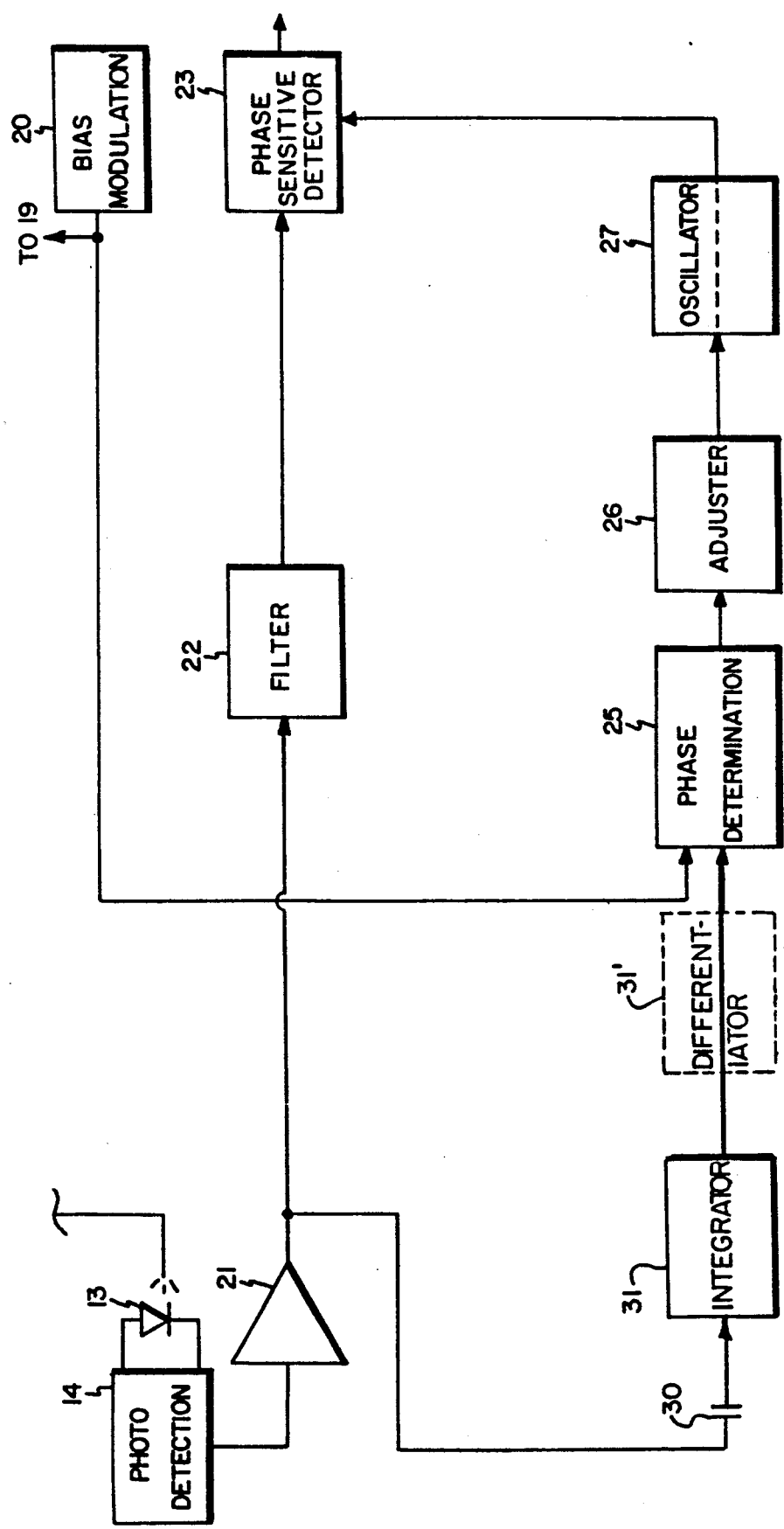
FIG. 3 shows a mixed block and circuit schematic diagram embodying the present invention which can be substituted for a portion of the diagram of FIG. 1.

As an alternative which eliminates having to filter the higher frequency involved in making use of the second harmonic component of the output voltage signal of amplifier 21, that output signal can instead be integrated after removing the constant polarity term therefrom. Such a system is shown in FIG. 3. The constant polarity term is removed by a capacitor, 30, with the remaining portions of the output voltage of amplifier 21 then supplied to the input of an integrator, 31. The result of the integration over time that provides a corresponding voltage at the output of integrator 31 can be written in expanded form as $$V_{31-out} = -\frac{1}{\omega_g}kJ_1(\phi_m)\sin\phi_R\sin(\omega_g t + \theta) -$$

-continued $$\frac{1}{2\omega_g} kJ_2(\phi_m)\cos\phi_R\sin 2(\omega_g t + \theta) +$$

$$\frac{1}{3\omega_g} kJ_3(\phi_m)\sin\phi_R\sin 3(\omega_g t + \theta) +$$

$$\sum_{n=2}^{\infty} \left[ (-1)^n \frac{1}{2n\omega_g} kJ_{2n}(\phi_m)\cos\phi_R\sin 2n(\omega_g t + \theta) + \right.$$

$$\left. (-1)^n \frac{1}{(2n+1)\omega_g} kJ_{2n+1}(\phi_m)\sin\phi_R\sin(2n+1)(\omega_g t + \theta) \right]$$

where the integral of the quadrature term has been neglected. Although the quadrature term in the output voltage of amplifier 21 can be significant with respect to the in-phase term at low rotation rates, the quadrature term will always be very small with respect to the second harmonic component of the output voltage of that amplifier.

The time integration performed by integrator 31 can be seen in the last equation to convert all of the time dependencies of the harmonic components in the output signal of amplifier 21 to being time dependent only through sine functions. Differing from cosine functions, the sine functions of the harmonics have amplitudes that cross zero value at various times but all cross zero value at the same time the amplitude of the first harmonic, or fundamental (at the modulation frequency $f_g$), crosses zero. Thus, a zero-crossing detector can be used again for phase determination means 25 to select those zero-crossings of the output voltage of amplifier 21 which are close to the zero-crossings of the output voltage of bias modulator generator 20. The zero-crossings of the output voltage of integrator 31 will be $$t_n = \frac{n\pi}{\omega_g} - \frac{\theta}{\omega_g}$$

As a result, the remaining portions of FIG. 3 can for the most part match those of the system of FIG. 2 including phase determination means 25, phase adjuster 26 and an oscillator 27. However, a divider is omitted as the zero-crossings in the system of FIG. 3 are determined commensurate with the fundamental or first harmonic component of the output voltage of amplifier 21 rather than its second harmonic component as in the system of FIG. 2. Again, oscillator 27 can be omitted, as indicated by the dashed line therethrough, in circumstances where phase determination means 25 provides an oscillatory output rather than merely providing synchronizing pulses indicating zero-crossings of the output voltage of integrator 31. Phase adjuster 26 is then adjusted to provide a phase delay equal to that provided by band-pass filter 22, or $\psi_1$.

However, if the harmonic components of the output voltage of amplifier 21 are not equally well integrated by integrator 31 because of bandwidth limitations therein, for instance, some of the higher and more poorly integrated harmonics will no longer cross zero amplitude value at the same time that the fundamental harmonic does. Hence, the bandwidth of integrator 31 must be sufficient to integrate all of the harmonic components of the output voltage of amplifier 21 which have any significant amplitude. As an alternative, a differentiator, 31', shown as a dashed line box in FIG. 2, could be substituted for capacitor 30 and integrator 31 to provide a time dependence in the harmonics that is again represented in a set of harmonic sine functions. This may, in some circumstances, be a more desirable choice than integration.

The systems of FIGS. 2 and 3 both require forming a reference signal for phase-sensitive detector 23 therein which has a frequency equal to that in the output voltage of bias modulation generator 20, or modulation frequency $f_g$, a frequency which might typically be on the order of 50 kHz. Phase-sensitive detection, or demodulation, that requires shifting from a frequency at the fundamental of the rotation rate data signal supplied at the output of filter 22, i.e. $f_g$, to a baseband frequency value devoid of any significant amount of the modulation frequency, or the harmonics thereof, can be difficult to do accurately because of limitations in the components available for phase-sensitive detector 23. FIG. 4 shows an alternative approach, based on the example of the system of FIG. 3, which uses two steps in the demodulation of the output signal $v_{22\text{-}out}$ of filter 22. In the first step, the frequency of the modulation frequency component, or fundamental component, of voltage $v_{22\text{-}out}$, supplied by amplifier 21 and selected by filter 22, is first shifted to a much lower frequency, a typical value being 3 kHz. The resulting signal at that frequency is then submitted to a phase-sensitive detector to complete the demodulation process, that detector also receiving a reference signal at this lower frequency for that purpose.

To provide such a two step demodulation, the system of FIG. 3 is shown modified in FIG. 4 as an example, and includes modifying bias modulation generator 20 thereby leading to its being redesignated 20' in FIG. 4. Generator 20' now has three different output voltages which have a fixed frequency and phase relationship with one another such as can be established through using phase-lock techniques in a well-known manner. The modulation output voltage of generator 20' is, of course, supplied as it was in the system of FIG. 3 remaining equal to $C_1\sin\omega_g t$. This voltage waveform at modulation frequency $f_g$ is again supplied to modulator 19, and is again supplied to phase determination means 25. Thus, the zero-crossings of the output voltage of integrator 31 which are closest to the zero-crossings of the generator 25 output voltage waveform operating modulator 19 can again be found just as they were in the system of FIG. 3. Generator 20' further supplies a frequency shifting voltage output waveform $C_2\cos(\omega_s t + \alpha_s)$ which might have a frequency value for $\omega_s/2\pi = f_s$ of 47 kHz if $f_g = 50$ kHz. There will be some phase shift associated therewith also which has been designated $\alpha_s$. This voltage is applied to a frequency down converter, 23', as part of the demodulation system to provide a downward shift in the effective modulation frequency so that the output signal from down converter 23' will have frequencies around 3 kHz. This voltage $C_2\cos(\omega_s t + \alpha_s)$ from generator 20' is mixed with the rotation rate data signal supplied at the output of filter 22, or $v_{22\text{-}out}$ as given above. This mixing will result in the following voltage signal at the output of frequency down converter 23'

$$v_{23'\text{-}out} = k'J_1(\phi_m)\sin\phi_R\cos[(\omega_g - \omega_s)t + \theta + \psi_1 - \alpha_s] +$$

$$\epsilon'\sin[(\omega_g - \omega_s)t + \theta + \psi_1 - \alpha_s]$$

There is typically no difficulty with a system component frequency shifting or converting like frequency down converter 23' in being capable of providing a frequency conversion at the frequency levels involved therein, 47 kHz and 50 kHz. Demodulation difficulties of the kind indicated above arise instead in going from the modulation frequency directly to the baseband. The constants k' and $\epsilon'$ represent the cumulative effect of system component gain constants occurring through the system to the point of the output of frequency down converter 23'.

Generator 20' provides a third output signal $C_3\cos(\omega_d t + \alpha_d)$, and supplies it to the phase adjuster which merely supplies a phase change therein before passing it on, and so has been redesignated 26' in FIG. 4. The frequency $\omega_d/2\pi = f_d$ is fixed at being the difference between the other two frequencies supplied thereby, $f_g$ and $f_s$ or $\omega_d = \omega_g - \omega_s$. This can be seen to be precisely the frequency occurring in the time dependent terms in the equation for the output voltage $v_{23'\text{-}out}$ of frequency down converter 23' above. Hence, the equation for the output voltage of frequency down converter 23' can be rewritten $$v_{23'\text{-}out} = -k'J_1(\phi_m)\sin\phi_R\cos(\omega_d t + \theta + \psi_1 - \alpha_s) + \epsilon'\sin(\omega_d t + \theta + \psi_1 + \alpha_s)$$

Thus, this output voltage signal from frequency down converter 23' can be clearly demodulated so as to eliminate the quadrature based term therein by a cosine waveform varying with radian frequency $\omega_d$, and just such a voltage is available from bias modulation generator 20' as indicated above, voltage $C_3\cos(\omega_d t + \alpha_d)$. However, a phase shift must be added thereto so that it has the same phase as the in-phase cosine term in the preceding equation. Hence, this voltage from generator 20' to be supplied to adjuster 26' must have a phase adjustment made thereto equal to $\theta + \psi_1 - \alpha_s - \alpha_d$. As indicated above, phase shifts (a) $\psi_1$, due to filter 22, (b) $\alpha_s$, appearing in the frequency shifting signal supplied from bias modulation generator 20' to frequency down converter 23', and (c) $\alpha_d$, appearing in the demodulation signal supplied from bias modulation generator 20' to adjuster 26' are all known, and so can be preset in adjuster 26'. Phase shift $\theta$, due to the optical system and photodetection circuit 14, is not fixed and known, but its values are obtained from phase determination means 25. These are found from the zero-crossing times of the bias modulation generator 20', which occur at $t_n = n\pi/\omega_g$, and the zero-crossing times of the signal from integrator 31, which are $t_n = (n\pi - \theta)/\psi_g$, as clearly these equations permit $\theta$ to be determined. Thus, adjuster 26' has the information necessary to provide the proper additional phase shift to the demodulation signal being supplied by bias modulation generator 20' to provide an output signal from adjuster 26' as follows:

$$v_{26'\text{-}out} = C_3\cos(\psi_d t + \theta + \psi - \alpha_s)$$

This output signal from adjuster 26' supplies the reference signal for phase-sensitive detector 23" and will be accurately synchronized with the output signal of down converter 23' for demodulating the rotation data rate signal supplied to detector 23" thereby. The result will be $$v_{23''\text{-}out} = k''J_1(\omega_m)\sin\omega_R$$

where again no quadrature based component results. The constant k" again represents the accumulated component gain constants through the system.

Although the present invention has been described with reference to preferred embodiments, workers skilled in the art will recognize that changes may be made in form and detail without departing from the spirit and scope of the invention.

What is claimed is:

1. An information retrieval system for extracting information from a pair of substantially coherent electromagnetic waves represented by phase differences therebetween each of which is incident on a photodetector means, said pair of substantially coherent electromagnetic waves being provided by a source generation means with further phase differences provided therebetween varying at a modulation frequency due to each being phase modulated, said photodetector means being capable of providing an output signal at an output thereof representing said pair of substantially coherent electromagnetic waves as incident thereon and also representing any further processing phase shifts due to either of said source generation means and said photodetector means, said information retrieval system comprising:

a demodulator means having an information signal input electrically connected to said photodetector means output, and having a reference signal input and an output, said demodulator means being capable of providing at said output thereof an output signal substantially free of frequency components at said modulation frequency corresponding to an input signal provided at said information signal input thereof having a substantial signal component therein at said modulation frequency if a reference signal at said modulation frequency having a selected phase relationship with said input signal modulation frequency component is provided at said reference signal input thereof;

a phase shift detection means having an input electrically connected to said photodetector means output, and having an output, said phase shift detection means being capable of providing at said output thereof an output signal containing a representation of selected events in input signals provided at said information signal input of said demodulator means repeated substantially at said modulation frequency as an indication of that said processing phase shift occurring therein; and a reference signal supply means having an input electrically connected to said phase shift detection means output, and having an output electrically connected to said demodulator means reference signal input, said reference signal supply means being capable of providing at said output thereof an output signal with a phase determined at least in part by input signals provided at said input thereof.

2. The apparatus of claim 1 wherein said source generation means is a rotation sensor capable of sensing rotation about an axis of a coiled optical fiber based on having said pair of substantially coherent electromagnetic waves propagating through said optical fiber in opposing directions to both impinge on said photodetector means.

3. The apparatus of claim wherein said demodulator means has a filter means having an input electrically connected to said information signal input thereof and having an output, said filter means being capable of passing primarily those frequency components of said photodetector means output signal which are within a selected range about said modulation frequency.

4. The apparatus of claim 1 wherein said phase shift detection means has a filter means having an input electrically connected to said input thereof and having an output, said filter means being capable of passing primarily those frequency components of said photodetector means output signal which are within a selected range about a frequency that is a selected multiple of said modulation frequency.

5. The apparatus of claim 1 wherein said phase shift detection means has an integration means having an input electrically connected to said input thereof through a blocking means capable of signal portions with frequencies near zero and having an output, said integration means being capable of providing as an output signal that result obtained by integrating over time those frequency components of said photodetector means output signal which include any of said modulation frequency and those frequencies which are selected multiples thereof.

6. The apparatus of claim 1 wherein said phase shift detection means has a differentiation means having an input electrically connected to said input thereof and having an output, said differentiation means being capable of providing as an output signal that result obtained by differentiating over time those frequency components of said photodetector means output signal which include any of said modulation frequency and those frequencies which are selected multiples thereof.

7. The apparatus of claim 2 wherein said information retrieval system further comprises a phase modulation means having an input and being positioned in an optical path portion selected from among those optical path portions taken by said pair of substantially coherent electromagnetic waves to reach or leave said coiled optical fiber enroute on an optical path to said photodetector means, said phase modulation means being capable of phase modulating said pair of substantially coherent electromagnetic waves at said modulation frequency in accord with an output signal at said modulation frequency provided at an output of a phase modulation signal generator which is electrically connected to said phase modulation means input.

8. The apparatus of claim 3 wherein said filtering means has a predetermined characteristic at said modulation frequency.

9. The apparatus of claim 3 wherein said demodulator means comprises a frequency down converter means having a data signal input, a shifting signal input and an output, said frequency down converter means being capable of converting in frequency a signal received on its data signal input at an initial frequency to another subsequent frequency value separated from said initial frequency by that frequency contained in a signal provided on said shifting signal input, said data signal input being electrically connected to said filter means output.

10. The apparatus of claim 3 wherein said demodulator means comprises a phase-sensitive detector having a modulated input electrically connected to said filter means output and a standards input electrically connected to said demodulator means reference signal input, and having an output electrically connected to said demodulator means output.

11. The apparatus of claim 4 wherein said filtering means has a predetermined characteristic at said selected multiple of said modulation frequency.

12. The apparatus of claim 4 wherein said phase shift detection means further comprises a zero-crossing determination means having a data input electrically connected to said filtering means output and having an output, said zero-crossing determination means being capable of determining those times a signal on its input has a value of zero and providing an output signal at its output indicating at least selected occurrences of same.

13. The apparatus of claim 4 wherein said reference signal supply means further comprises a phase adjustor means having an input electrically connected to said phase shift detection means output and having an output, said phase adjustor means being capable of providing an output signal on its output adding a selected phase shift to signals received on its input.

14. The apparatus of claim 5 wherein said phase shift detection means further comprises a zero-crossing determination means having a data input electrically connected to said integration means output and having an output, said zero-crossing determination means being capable of determining those times a signal on its input has a value of zero and providing an output signal at its output indicating at least selected occurrences of same.

15. The apparatus of claim 5 wherein said reference signal supply means further comprises a phase adjustor means having a data input electrically connected to said reference signal supply means output and having an output, said phase adjustor means being capable of providing an output signal on its output adding a selected phase shift to signals received on its data input.

16. The apparatus of claim 6 wherein said phase shift detection means further comprises a zero-crossing determination means having a data input electrically connected to said differentiation means output and having an output, said zero-crossing determination means being capable of determining those times a signal on its input has a value of zero and providing an output signal at its output indicating at least selected occurrences of same.

17. The apparatus of claim 6 Wherein said reference signal supply means further comprises a phase adjustor means having a data input electrically connected to said phase reference signal supply means input and having an output, said phase adjustor means being capable of providing an output signal on its output adding a selected phase shift to signals received on its data input.

18. The apparatus of claim 9 wherein said demodulator means further comprises a phase-sensitive detector having a modulated input electrically connected to said frequency down converter means output and a standards input electrically connected to said demodulator means reference signal input, and having an output electrically connected to said demodulator means output.

19. The apparatus of claim 12 wherein said information retrieval system further comprises a phase modulation means having an input and being positioned in an optical path portion selected from among those optical path portions taken by said pair of substantially coherent electromagnetic waves to reach or leave said coiled optical fiber enroute on an optical path to said photodetector means, said phase modulation means being capable of phase modulating said pair of substantially coherent electromagnetic waves at said modulation frequency in accord with a first output signal at said modulation frequency provided at a first output of a phase modulation signal generator which is electrically connected to said phase modulation means input, said zero-crossing determination means also having a reference input and being capable of using signals provided thereat to select those of said occurrences of said crossings of zero that are to be indicated in said output signal thereof, said phase modulation signal generator first output being electrically connected to said zero-crossing determination means reference input.

20. The apparatus of claim 13 wherein said reference signal supply means further comprises a frequency divider means which provides at said reference signal supply means output signals which have a frequency therein reduced from a frequency in signals provided at said reference signal supply means input by a factor equaling that reciprocal value of said selected multiple.

21. The apparatus of claim 13 wherein said phase shift detection means further comprises a zero-crossing determination means having a data input electrically connected to said filtering means output and having an output, said zero-crossing determination means being capable of determining those times a signal on its input has a value of zero and providing an output signal at its output indicating at least selected occurrences of same.

22. The apparatus of claim 14 wherein said information retrieval system further comprises a phase modulation means having an input and being positioned in an optical path portion selected from among those optical path portions taken by said pair of substantially coherent electromagnetic waves to reach or leave said coiled optical fiber enroute on an optical path to said photodetector means, said phase modulation means being capable of phase modulating said pair of substantially coherent electromagnetic waves at said modulation frequency in accord with a first output signal at said modulation frequency provided at a first output of a phase modulation signal generator which is electrically connected to said phase modulation means input, said zero-crossing determination means also having a reference input and being capable of using signals provided thereat to select those of said occurrences of said crossings of zero that are to be indicated in said output signal thereof, said phase modulation signal generator first output being electrically connected to said zero-crossing determination means reference input.

23. The apparatus of claim 15 wherein said phase shift detection means further comprises a zero-crossing determination means having a data input electrically connected to said integration means output and having an output, said zero-crossing determination means being capable of determining those times a signal on its input has a value of zero and providing an output signal at its output indicating at least selected occurrences of same.

24. The apparatus of claim 16 wherein said information retrieval system further comprises a phase modulation means having an input and being positioned in an optical path portion selected from among those optical path portions taken by said pair of substantially coherent electromagnetic waves to reach or leave said coiled optical fiber enroute on an optical path to said photodetector means, said phase modulation means being capable of phase modulating said pair of substantially coherent electromagnetic waves at said modulation frequency in accord with a first output signal at said modulation frequency provided at a first output of a phase modulation signal generator which is electrically connected to said phase modulation means input, said zero-crossing determination means also having a reference input and being capable of using signals provided thereat to select those of said occurrences of said crossings of zero that are to be indicated in said output signal thereof, said phase modulation signal generator first output being electrically connected to said zero-crossing determination means reference input.

25. The apparatus of claim 17 wherein said phase shift detection means further comprises a zero-crossing determination means having a data input electrically connected to said differentiation means output and having an output, said zero-crossing determination means being capable of determining those times a signal on its input has a value of zero and providing an output signal at its output indicating at least selected occurrences of same.

26. The apparatus of claim 18 wherein said information retrieval system further comprises a phase modulation means having an input and being positioned in an optical path portion selected from among those optical path portions taken by said pair of substantially coherent electromagnetic waves to reach or leave said coiled optical fiber enroute on an optical path to said photodetector means, said phase modulation means being capable of phase modulating said pair of substantially coherent electromagnetic waves at said modulation frequency in accord with a first output signal at said modulation frequency provided at a first output of a phase modulation signal generator which is electrically connected to said phase modulation means input, said phase modulation signal generator having a second output at which it provides a second output signal of a frequency having a fixed relationship with said modulation frequency, said phase modulation signal generator second output being electrically connected to said frequency down converter means shifting signal input.

27. The apparatus of claim 20 wherein said reference signal supply means further comprises an oscillator means having an input electrically connected to said phase adjustor and having an output, said oscillator means being capable of being directed by signals at said input thereof to provide an oscillatory output signal at its output of selected frequency and phase.

28. The apparatus of claim 23 wherein said information retrieval system further comprises a phase modulation means having an input and being positioned in an optical path portion selected from among those optical path portions taken by said pair of substantially coherent electromagnetic waves to reach or leave said coiled optical fiber enroute on an optical path to said photodetector means, said phase modulation means being capable of phase modulating said pair of substantially coherent electromagnetic waves at said modulation frequency in accord with a first output signal at said modulation frequency provided at a first output of a phase modulation signal generator which is electrically connected to said phase modulation means input, said zero-crossing determination means also having a reference input and being capable of using signals provided thereat to select those of said occurrences of said crossings of zero that are to be indicated in said output signal thereof, said phase modulation signal generator first output being electrically connected to said zero-crossing determination means reference input.

29. The apparatus of claim 23 wherein said phase modulation signal generator has a second output at which it provides a second output signal of a frequency having a fixed relationship with said modulation frequency, said phase adjustor has also a reference input and is capable of adding phase shifts occurring in, and added to, signals received at said data input thereof to signals received at said reference input thereof, said phase modulation signal generator second output being electrically connected to said phase adjustor reference input.

30. The apparatus of claim 25 wherein said information retrieval system further comprises a phase modulation means having an input and being positioned in an optical path portion selected from among those optical path portions taken by said pair of substantially coherent electromagnetic waves to reach or leave said coiled optical fiber enroute on an optical path to said photodetector means, said phase modulation means being capable of phase modulating said pair of substantially coherent electromagnetic waves at said modulation frequency in accord with a first output signal at said modulation frequency provided at a first output of a phase modulation signal generator which is electrically connected to said phase modulation means input, said zero-crossing determination means also having a reference input and being capable of using signals provided thereat to select those of said occurrences of said crossings of zero that are to be indicated in said output signal thereof, said phase modulation signal generator first output being electrically connected to said zero-crossing determination means reference input.

31. The apparatus of claim 27 wherein said phase shift detection means further comprises a zero-crossing determination means having a data input electrically connected to said integration means output and having an output, said zero-crossing determination means being capable of determining those times a signal on its input has a value of zero and providing an output signal at its output indicating at least selected occurrences of same.

32. The apparatus of claim 1 wherein said reference signal supply means is capable of providing at said output thereof an output signal with a phase determined by both input signals provided at said input thereof and by predetermined phase shift information previously supplied thereto.

* * * * *

UNITED STATES PATENT AND TRADEMARK OFFICE
CERTIFICATE OF CORRECTION

PATENT NO. : 5,148,236

DATED : September 15, 1992

INVENTOR(S) : J.N. BLAKE ET AL.

It is certified that error appears in the above-identified patent and that said Letters Patent is hereby corrected as shown below:

Column 14, line 65, insert --1-- after claim

Column 16, line 39, delete "Wherein" and insert --wherein--

Signed and Sealed this

Fourteenth Day of September, 1993

Attest:

BRUCE LEHMAN

Attesting Officer

Commissioner of Patents and Trademarks